United States Patent
Noguchi et al.

(10) Patent No.: US 11,454,059 B2
(45) Date of Patent: Sep. 27, 2022

(54) VEHICLE SIDE DOOR OPENING/CLOSING DEVICE

(71) Applicant: MITSUI KINZOKU ACT CORPORATION, Yokohama (JP)

(72) Inventors: Kiichi Noguchi, Yokohama (JP); Kazuyuki Sasaki, Yokohama (JP)

(73) Assignee: Mitsui Kinzoku Act Corporation, Yokohama (JP)

(*) Notice: Subject to any disclaimer, the term of this patent is extended or adjusted under 35 U.S.C. 154(b) by 0 days.

(21) Appl. No.: 16/925,679

(22) Filed: Jul. 10, 2020

(65) Prior Publication Data
US 2021/0025213 A1 Jan. 28, 2021

(30) Foreign Application Priority Data
Jul. 22, 2019 (JP) .............................. JP2019-134284

(51) Int. Cl.
E05F 11/00 (2006.01)
E05F 15/619 (2015.01)
B60J 5/04 (2006.01)

(52) U.S. Cl.
CPC ............. *E05F 15/619* (2015.01); *B60J 5/047* (2013.01); *E05Y 2201/11* (2013.01);
(Continued)

(58) Field of Classification Search
CPC ......... E05F 15/63; E05F 15/41; E05F 15/611; E05F 15/619; E05F 15/00; E05Y 2201/00;
(Continued)

(56) References Cited

U.S. PATENT DOCUMENTS

| 10,287,815 B2 | 5/2019 | Kitamura et al. |
| 10,590,691 B2 | 3/2020 | Gruber et al. |

(Continued)

FOREIGN PATENT DOCUMENTS

| JP | 06-006680 U | 1/1994 |
| JP | 2004-130873 A | 4/2004 |

(Continued)

OTHER PUBLICATIONS

Japanese Office Action of corresponding patent application No. 2019-134284 dated May 10, 2022.

*Primary Examiner* — Chi Q Nguyen
(74) *Attorney, Agent, or Firm* — Finch & Maloney, PLLC; Michael Bujold; Jay Franklin

(57) ABSTRACT

A vehicle side door opening/closing device includes a motor, a gear case to which the motor is fixed and which is fixed to a side door, a speed reducer built in the gear case, an output gear provided to the speed reducer, a rack of which an end portion is pivotably supported to a vehicle body and which is provided with a rack gear, and an engagement holding unit connected with the gear case and movably supporting the rack while constantly keeping an engagement allowance between the rack and the output gear. The side door is moved in an opening direction by pushing the rack and in a closing direction by pulling the rack respectively following the rotation of the output gear. The engagement holding unit rotates around a rotation center of the output gear by a swing of the rack following the opening/closing operation of the side door.

5 Claims, 12 Drawing Sheets

(52) U.S. Cl.
CPC ..... *E05Y 2201/224* (2013.01); *E05Y 2201/41* (2013.01); *E05Y 2201/422* (2013.01); *E05Y 2201/688* (2013.01); *E05Y 2201/706* (2013.01); *E05Y 2201/716* (2013.01); *E05Y 2201/722* (2013.01); *E05Y 2900/531* (2013.01)

(58) Field of Classification Search
CPC ........... E05Y 2201/72; E05Y 2201/716; E05Y 2201/692; E05Y 2201/722; E05Y 2900/531; F16H 1/28; F16H 2025/2087; F16H 3/00
USPC ......... 49/359, 349, 375, 348, 350, 351, 372, 49/374, 340, 358
See application file for complete search history.

(56) References Cited

U.S. PATENT DOCUMENTS

| | | | | |
|---|---|---|---|---|
| 2007/0063536 A1* | 3/2007 | Okada | .................. | E05F 15/619 |
| | | | | 296/146.4 |
| 2007/0151158 A1* | 7/2007 | Fenelon | ................ | E05F 11/423 |
| | | | | 49/349 |
| 2011/0060466 A1* | 3/2011 | Tandrow | ................ | G05B 19/19 |
| | | | | 700/275 |
| 2011/0061200 A1* | 3/2011 | Rauscher | ............. | E05C 17/006 |
| | | | | 16/337 |
| 2013/0318876 A1* | 12/2013 | Takakura | ............. | E05F 15/689 |
| | | | | 49/349 |
| 2016/0130852 A1* | 5/2016 | Choi | ....................... | F16H 19/04 |
| | | | | 49/404 |
| 2019/0112859 A1 | 4/2019 | Cumbo | | |
| 2019/0145146 A1* | 5/2019 | Linden | ................... | B60R 25/24 |
| | | | | 49/28 |

FOREIGN PATENT DOCUMENTS

| | | |
|---|---|---|
| JP | 2017-128940 A | 7/2017 |
| JP | 2018-505326 A | 2/2018 |
| WO | 2016/164023 A1 | 10/2016 |

\* cited by examiner

VEHICLE SIDE DOOR OPENING/CLOSING DEVICE

FIELD OF THE INVENTION

The present invention relates to a vehicle side door opening/closing device, and particularly relates to a vehicle side door opening/closing device for operating to open and close a side door by a motive power of a motor.

BACKGROUND OF THE INVENTION

Conventionally, in a vehicle provided with a vehicle side door opening/closing device for operating to open and close a side door that is swingingly supported to a vehicle body by a motive power of a motor, when a door latch device is unlatched, the side door is opened to a fully open position by the motive power of the motor in a driving unit, and when a door closing switch is operated, the side door is closed by the motor in the driving unit. The side door provided with the side door opening/closing device is sometimes referred to as "power hinge door."

JP 2017-128940 A and JP 2018-505326 A disclose a formation in which a driving unit of a side door opening/closing device is installed in an inner space of a side door. The driving unit comprises a motor and a speed reducer reducing rotation of the motor, an output shaft of the speed reducer is connected with a vehicle body side via a connection mechanism comprising a first link integrally rotating with the output shaft (referred to as "drive arm" and "lever" in JP 2017-128940 A and JP 2018-505326 A respectively) and a second link of which an end portion is rotatably connected with the first link and another end portion is rotatably connected with a bracket of the vehicle body (referred to as "driven arm" and "strap" in JP 2017-128940 A and JP 2018-505326 A respectively), and the side door is operated to open and close with respect to the vehicle body by rotating the first and second links with a motive power of the motor.

SUMMARY OF THE INVENTION

However, since each of the side door opening/closing devices described in JP 2017-128940 A and JP 2018-505326 A has the formation of which the connection mechanism connecting the driving unit with the vehicle body requires the two links and two pivotal shafts rotatably connecting the two links each other, there is a risk that malfunction of the connection mechanism occurs by a long-period operation owing to a complex formation with many parts so that the side door is impossible to be smoothly operated to open and close in a long-period operation by the motive power of the motor.

In view of the above problems of the conventional techniques, an object of the present invention is to provide a vehicle side door opening/closing device that has a simple formation for enabling a smooth opening/closing operation.

According to the present invention, the above problems are solved as follows.

A vehicle side door opening/closing device for operating to open and close a side door pivotably supported to a vehicle body by a door hinge, comprises;
  a motor provided in the side door;
  a gear case to which the motor is fixed and which is directly or indirectly fixed to the side door;
  a speed reducer built in the gear case and reducing rotation of a rotating shaft of the motor;
  an output gear provided to an output part of the speed reducer;
  a rack of which an end portion is pivotably supported to the vehicle body and another end portion is inserted into the side door, and which is provided with a rack gear along an edge portion of the rack to engage with the output gear; and
  an engagement holding unit connected with the gear case and movably supporting the rack in a longitudinal direction while constantly keeping an engagement allowance between the rack and the output gear,
  wherein the side door is moved in an opening direction by pushing the rack in the longitudinal direction following the rotation of the output gear and the side door is moved in a closing direction by pulling the rack in the longitudinal direction following the rotation of the output gear, and
  wherein the engagement holding unit is connected with the gear case to be rotatable around a rotation center of the output gear and rotates around the rotation center of the output gear by a swing of the rack following the opening/closing operation of the side door.

According to the present invention, since the rack engaging with the output gear is pivotably supported to the vehicle body, and the engagement holding unit for constantly keeping the engagement allowance between the rack and the output gear is rotatably supported to the gear case around the rotation center of the output gear, it is possible to simplify the formation and to smoothly operate to open and close the side door in a long period.

EMBODIMENTS OF THE INVENTION

Figure 1:
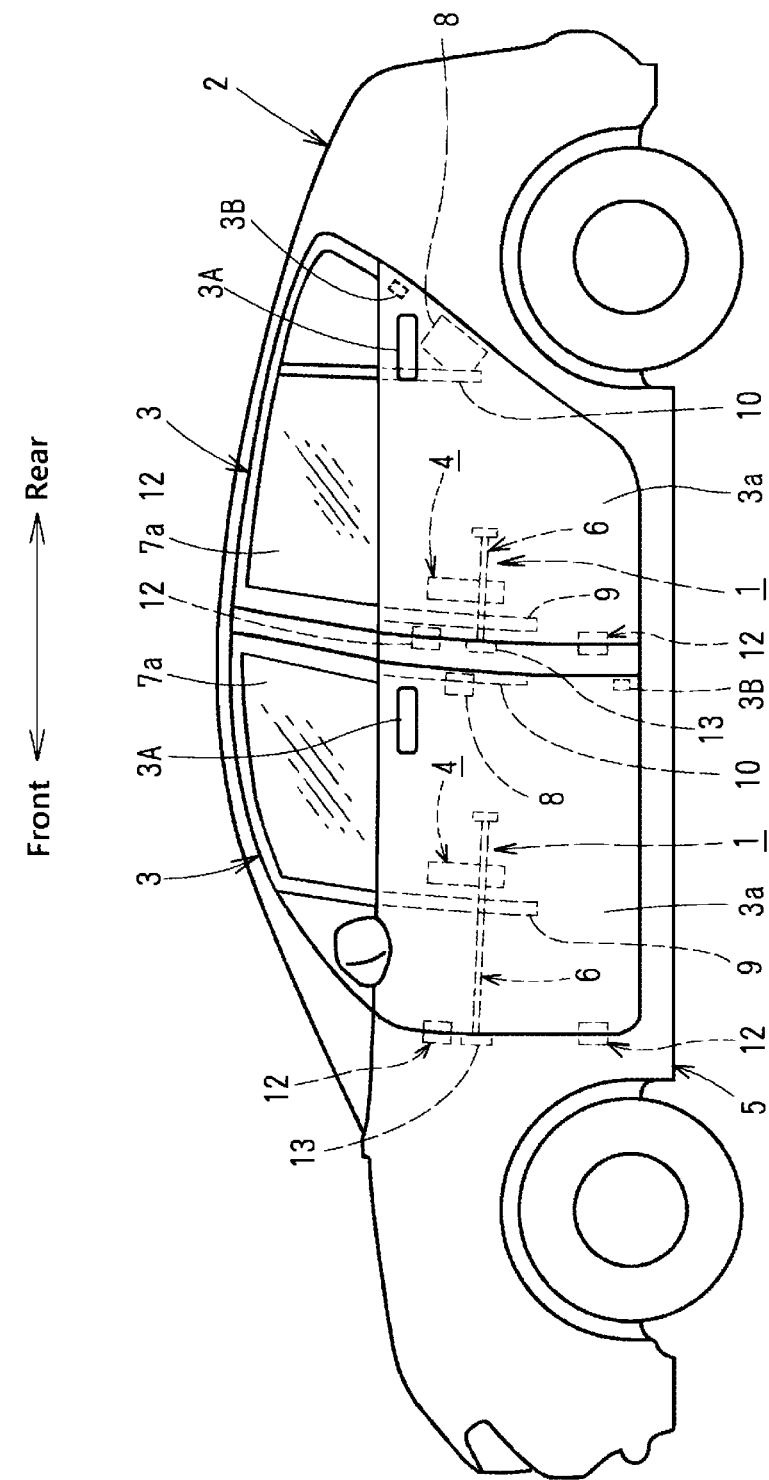
FIG. 1 is a side elevational view showing a vehicle to which a side door opening/closing device of the present invention is applied.
Figure 2:
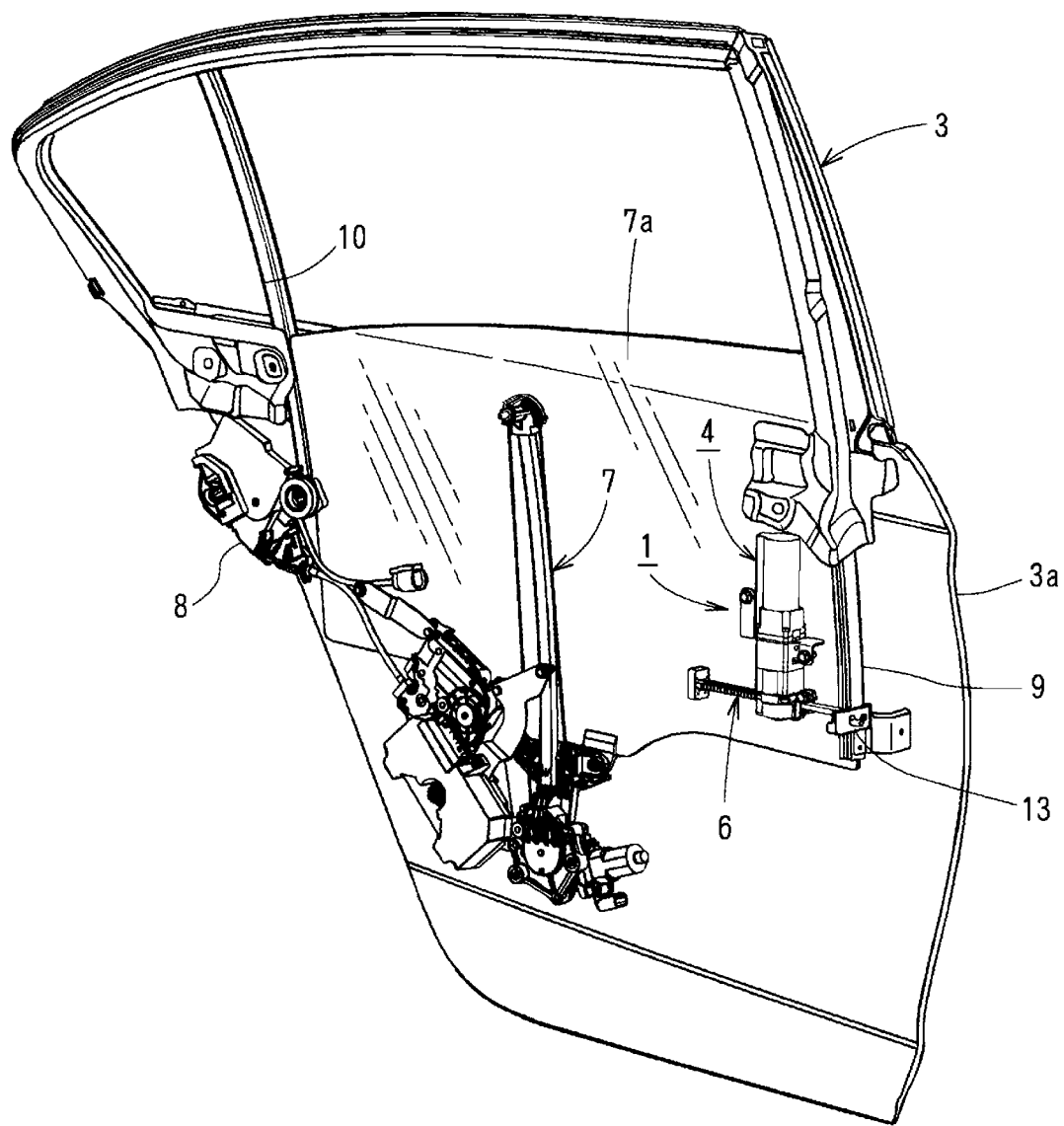
FIG. 2 is a perspective view showing an internal structure of a side door from which an inner panel is removed.
Figure 3:
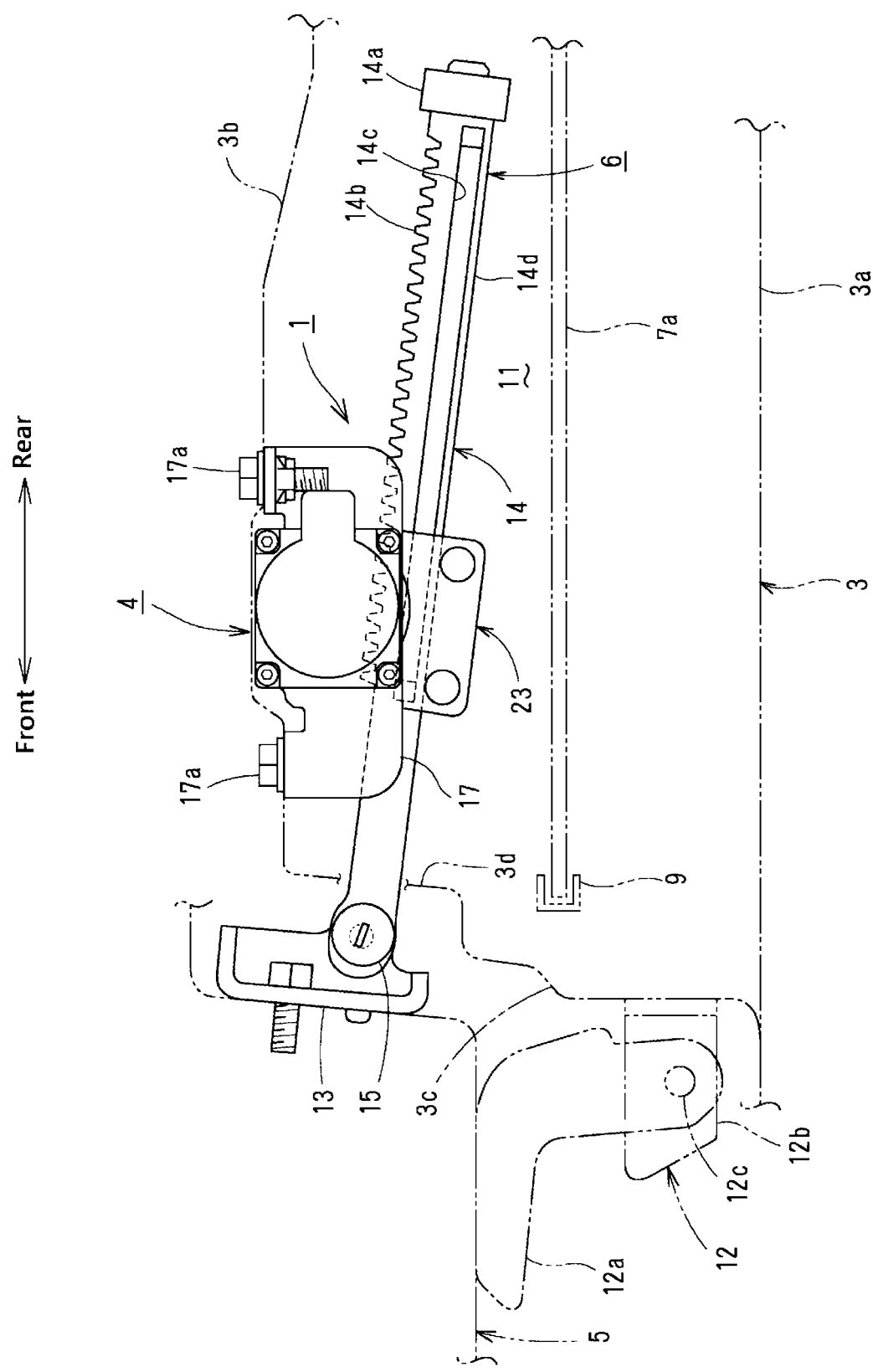
FIG. 3 is a plan view showing the side door opening/closing device when the side door is in a closed state.
Figure 4:
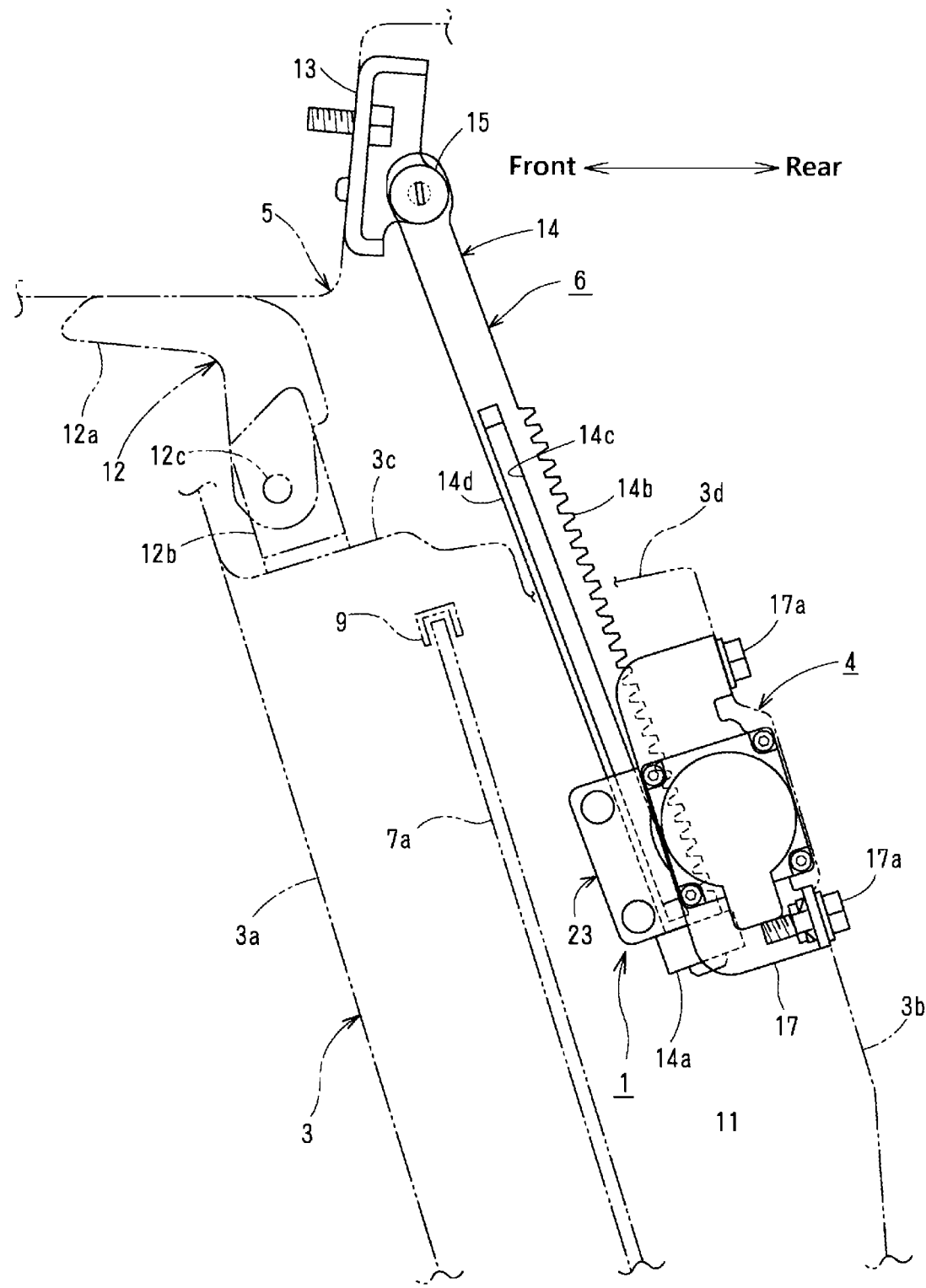
FIG. 4 is a plan view showing the side door opening/closing device when the side door is in a fully open state.
Figure 5:
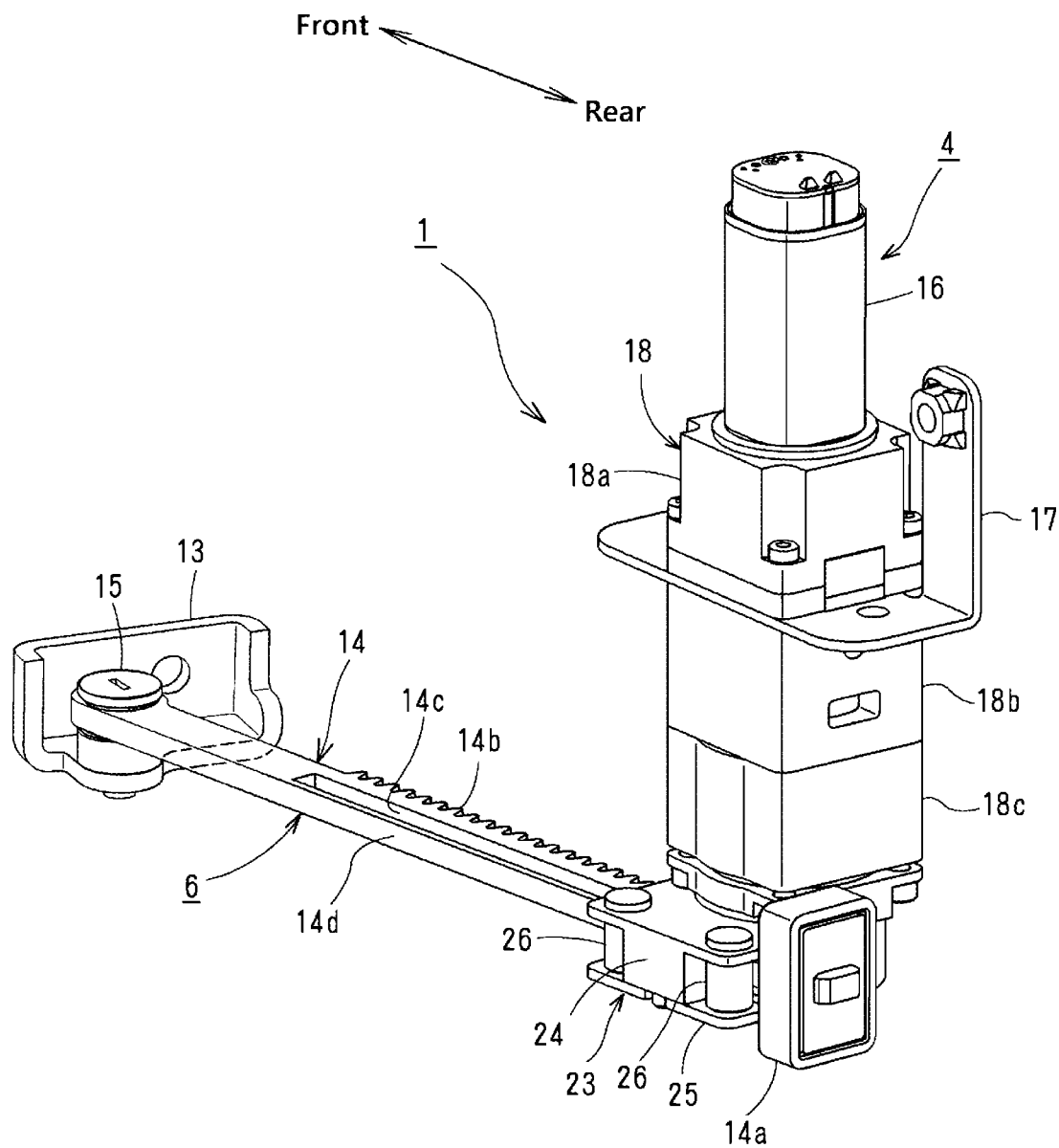
FIG. 5 is a perspective view showing the side door opening/closing device.
Figure 6:
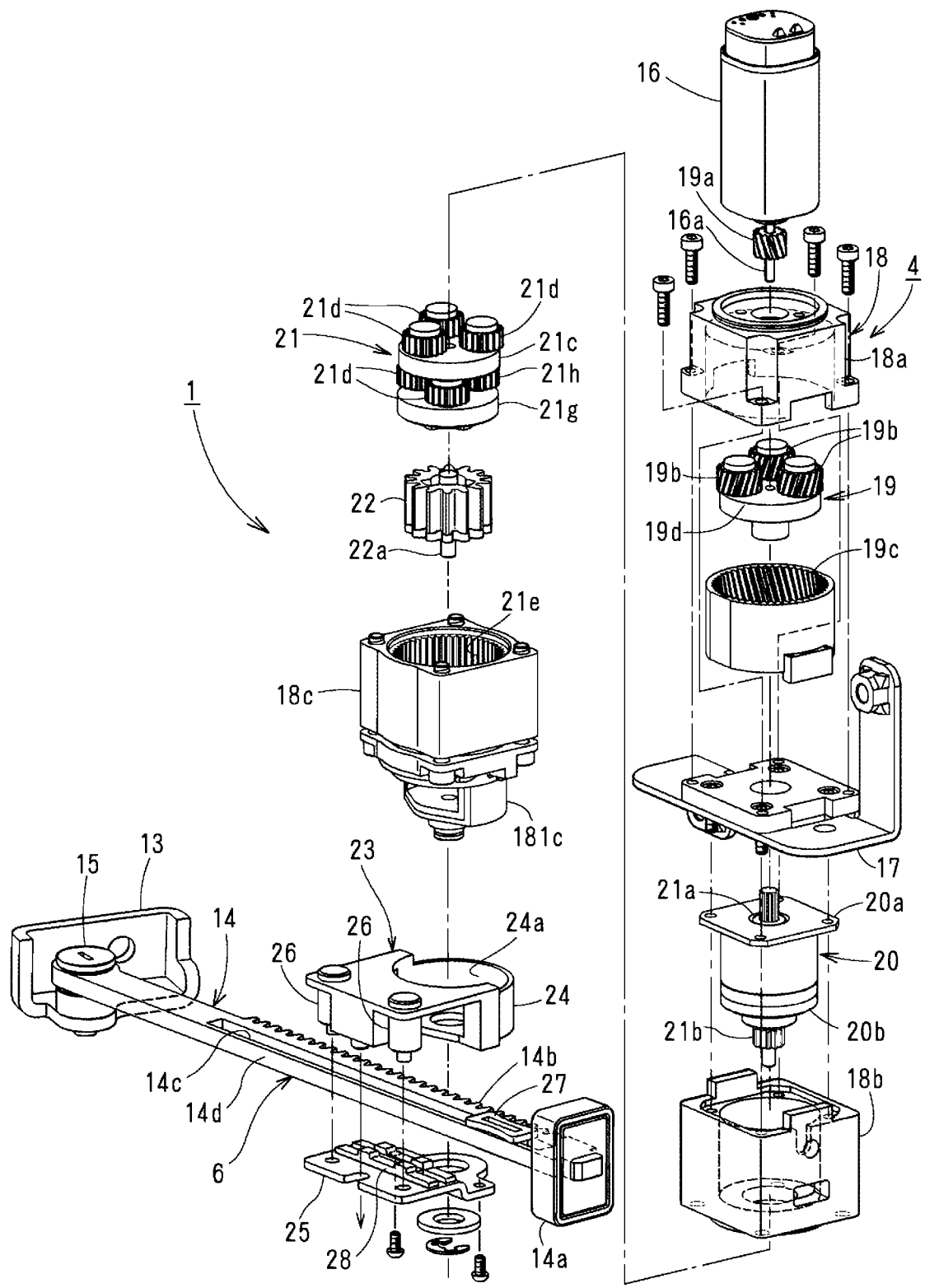
FIG. 6 is an exploded perspective view showing the side door opening/closing device.
Figure 7:
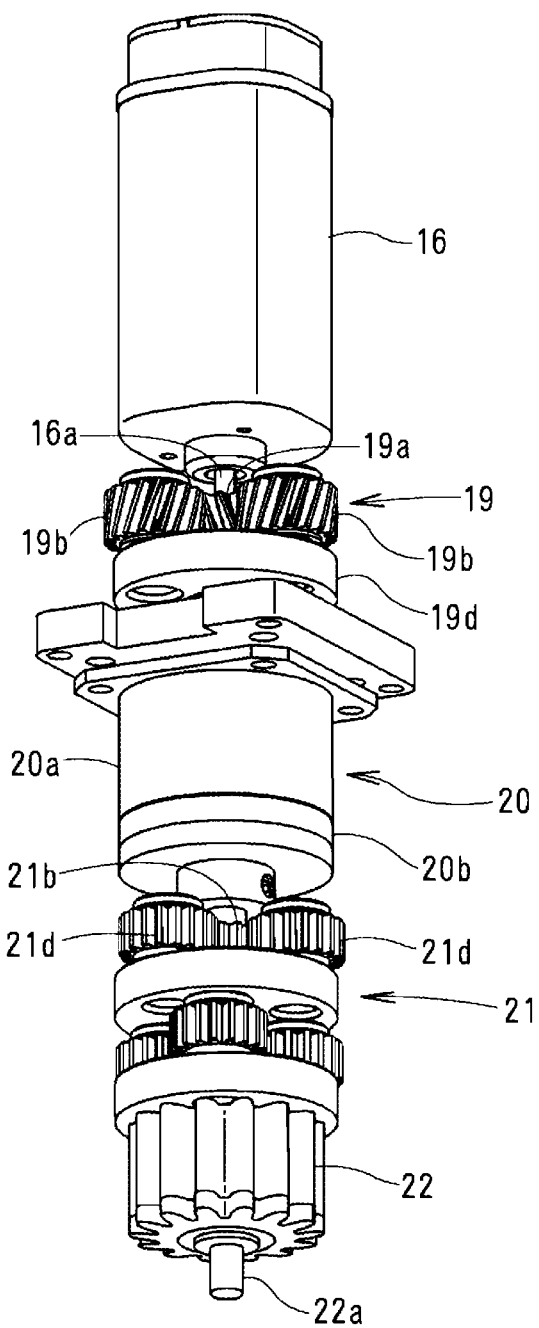
FIG. 7 is a perspective view schematically showing an internal structure of a driving unit of the side door opening/closing device.
Figure 8:
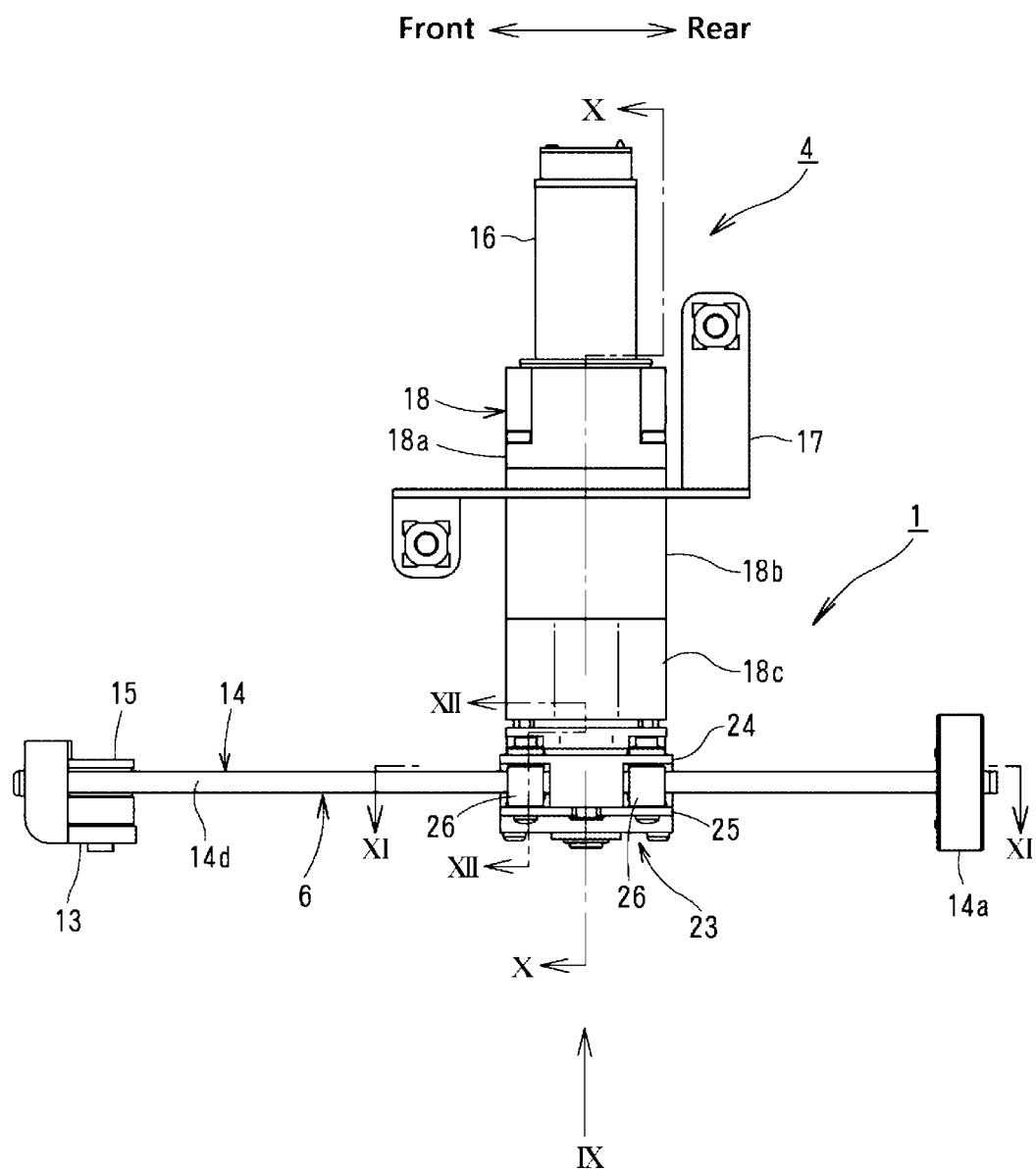
FIG. 8 is a side elevational view showing the side door opening/closing device.
Figure 9:
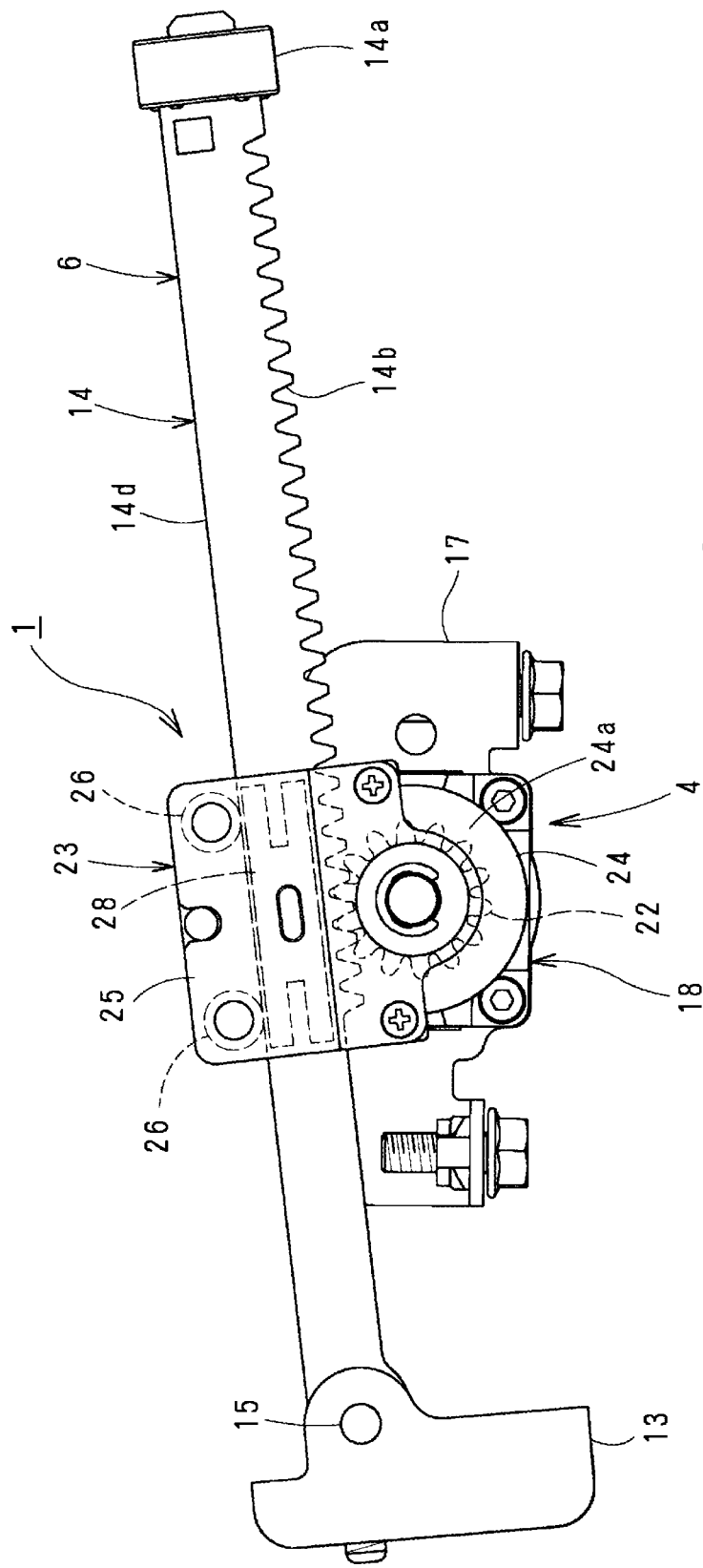
FIG. 9 is an arrow view taken along the arrow IX in FIG. 8.
Figure 10:
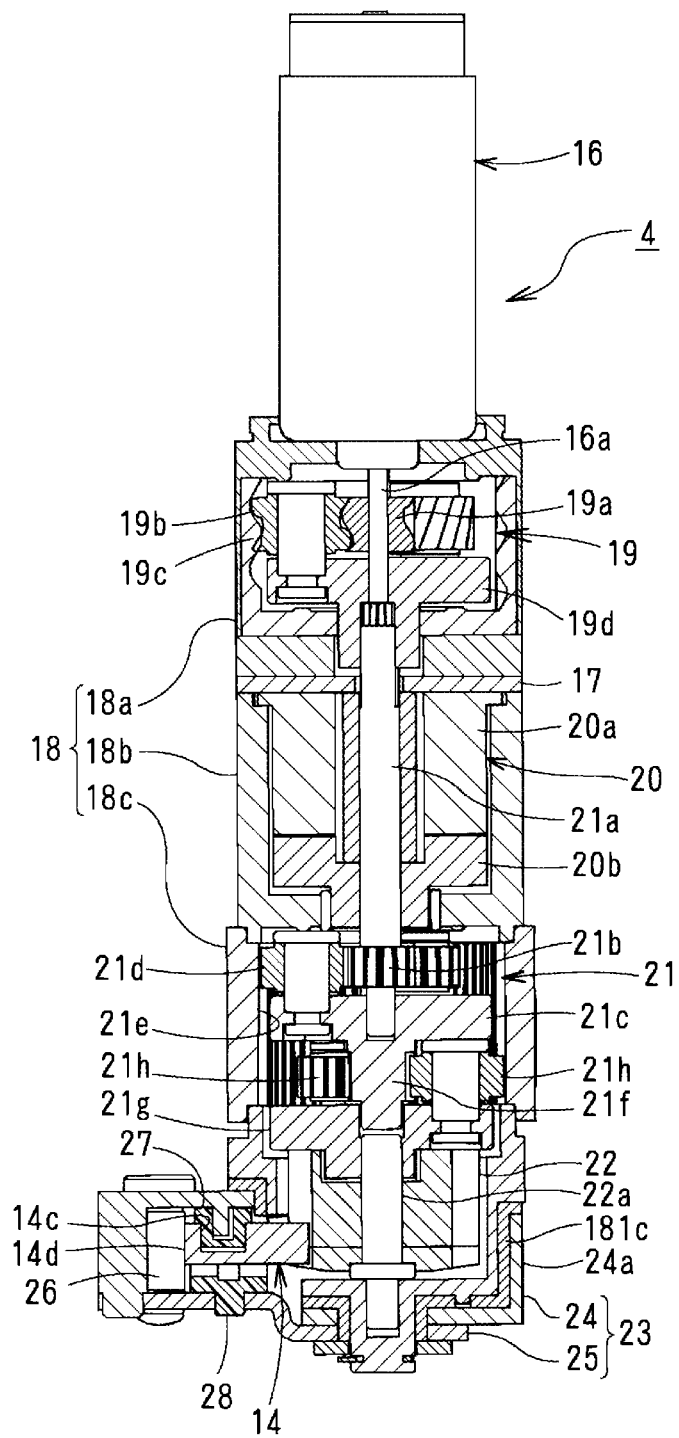
FIG. 10 is a sectional view taken along the line X-X in FIG. 8.

An embodiment according to the present invention is described with the drawings as follows. FIG. 1 is a side elevational view showing a vehicle 2 to which a side door opening/closing device 1 of the present invention is applied. FIG. 2 is a schematic perspective view showing an internal structure of a side door 3. FIG. 3 is a plan view showing the side door opening/closing device 1 when the side door 3 is in a closed state. FIG. 4 is a plan view showing the side door opening/closing device 1 when the side door 3 is in a fully open state.

The side door opening/closing device 1 of the present invention comprises a driving unit 4 arranged in a storage space in the side door 3 of the vehicle 2 and a connection mechanism 6 connecting the driving unit 4 with a vehicle body 5.

The side door 3 comprises a metal outer panel 3a forming an exterior side and a metal inner panel 3b forming an interior side. A trim panel (not shown) is preferably attached to the interior side surface of the inner panel 3b.

The side door 3 comprises a door glass 7a that is elevated and lowered by an elevating/lowering mechanism 7 provided in the side door 3, a door latch device 8 holding the side door 3 in a closed position, an outside handle 3A arranged on the outer panel 3a side, and an inside handle (not shown) arranged on the inner panel 3b side. An electrostatic capacitive sensor (not shown) detectable of contact or access of a user's hand is provided to the outside handle 3A or in the vicinity thereof. Moreover, an angular velocity sensor 3B detecting an opening angle of the side door 3 is provided to the side door 3. Preferably, the angular velocity sensor 3B is provided to a pivot end portion (rear end portion) of the side door 3. Detection signals respective of the electrostatic capacitive sensor and the angular velocity sensor 3B are sent to a controller (not shown) arranged at a proper position in the vehicle 2. The controller controls a motor 16 and a braking part 20 of the driving unit 4 (see below) based on each of the receiving detection signals.

The door glass 7a is supported at its front and rear edge portions by front and rear guide rails 9, 10 respectively so that it is slidably moved in a vertical direction. Thus, the door glass 7a is moved up and down between the outer and inner panels 3a, 3b to substantially partition an internal space between the outer and inner panels 3a, 3b. A storage space 11 in where the side door opening/closing device 1 is arranged is formed in a space partitioned between the door glass 7a and the inner panel 3b.

The side door 3 is pivotably supported to the vehicle body 5 by a pair of upper and lower door hinges 12, 12 to pivot in a transverse direction. The door hinge 12 comprises a fixing member 12a fixed to the vehicle body 5 and a moving member 12b pivotably coupled with the fixing member 12a by a hinge shaft 12c that is fixed to a front end surface of the side door 3 to be oriented in a vertical direction.

A vehicle body side bracket 13 is fixed to the vehicle body 5 between the pair of upper and lower door hinges 12, 12. The vehicle body side bracket 13 is connected with the driving unit 4 via a rack 14 composing the connection mechanism 6.

The rack 14 elongates horizontally in a front-back direction in the side door 3, and its front end portion goes through an opening 3d provided at a front panel 3c of the side door 3 to protrude and is pivotably coupled with the vehicle body side bracket 13 by a connecting shaft 15 oriented in the vertical direction. A stopper part 14a made of an elastic material such as rubber and so on is fixed to a rear end portion of the rack 14. A rack gear 14b is provided at an edge portion of the rack 14 facing the inner panel 3b along the longitudinal direction (front-back direction) of the rack 14. The rack gear 14b engages with a later-described output gear 22 of the driving unit 4. A guide recessed groove 14c is provided on an upper surface of the rack 14 along the longitudinal direction of the rack 14.

As shown in FIGS. 5 to 8, the driving unit 4 comprises the motor 16 arranged such that its rotating shaft 16a is oriented in the vertical direction; a gear case 18 that is connected with a lower portion of the motor 16 in series and is fixed to the inner panel 3b by a metal bracket 17; a first speed reducer 19, a braking part 20 and a second speed reducer 21 that are built in the gear case 18; the output gear 22 that is provided to the lowest part of the second speed reducer 21 and is an output part of the second speed reducer 21; and an engagement holding unit 23 that is connected with the lowest portion of the gear case 18 to be rotatable in a predetermined angle range around a vertical axis. According to this formation, rotation of the rotating shaft 16a of the motor 16 is reduced and transmitted to the output gear 22 by the first speed reducer 19, the braking part 20, and the second speed reducer 21.

The gear case 18 comprises an upper case part 18a to which the motor 16 is fixed, a middle case part 18b fixed to a lower portion of the upper case part 18a via the bracket 17 so as not to be rotatable, and a lower case part 18c fixed to a lower portion of the middle case part 18b so as not to be rotatable. The gear case 18 is fixed to the inner panel 3b by a bolt 17a via the bracket 17.

The first speed reducer 19 built in the upper case part 18a reduces the rotation of the rotating shaft 16a of the motor 16. As the first speed reducer 19, it is preferably used a planetary gear mechanism comprising a sun gear 19a which is fixed to the rotating shaft 16a of the motor 16, planetary gears 19b each of which is supported to a planetary carrier plate 19d to be rotatable around an axis in the vertical direction and is engaged with the sun gear 19a, and an inner gear 19c with which the planetary gears 19b are respectively engaged. Preferably, a rotation axis of the sun gear 19a coincides with that of the rotating shaft 16a of the motor 16.

An output of the first speed reducer 19 is transmitted to the second speed reducer 21 via the planetary carrier plate 19d and the braking part 20 under the planetary carrier plate 19d.

The braking part 20 comprises a brake assembly 20a and an armature 20b. The braking part 20 causes braking operation in a non-energizing stand-by state and a permanent magnet is used for braking in it. The braking part 20 is preferably a non-excitation actuated type electromagnetic brake. The braking part 20 is normally in a brake operating state in which the armature 20b is pulled to the brake assembly 20a by the permanent magnet, and gives a predetermined braking resistance for opening/closing operation of the side door 3. The braking resistance of the braking part 20 is released by applying a voltage to the brake assembly.

It is preferable that a braking force (holding torque) by the braking part 20 is able to be provided in two kinds of strong braking when the braking part 20 is not energized and weak braking when energization to the braking part 20 is controlled. The strong braking is set at a level approximately equal to a braking resistance (50 Nm) when the side door 3 is held at an open position by a general check link. Thus, in this working example, the strong braking of the braking part 20 can perform a function of a conventional check link, and it is possible to omit a check link.

The second speed reducer 21 further reduces rotation that is output from the first speed reducer 19, and comprises upper and lower planetary gear mechanisms. The upper planetary gear mechanism comprises an upper sun gear 21b provided to a lower portion of a connecting shaft 21a integrally rotating with the planetary carrier plate 19d of the first speed reducer 19, upper planetary gears 21d each of which is supported to an upper planetary carrier plate 21c to be rotatable around an axis in the vertical direction and is engaged with the upper sun gear 21b, and an inner gear 21e with which the upper planetary gears 21*d* are respectively engaged. The lower planetary gear mechanism further reduces rotation that is output from the upper planetary carrier plate 21*c* of the upper planetary gear mechanism, and comprises a lower sun gear 21*f* which downwardly projects from a lower surface of the upper planetary carrier plate 21*c*, lower planetary gears 21*h* each of which is supported to a lower planetary carrier plate 21*g* to be rotatable around an axis in the vertical direction and is engaged with the lower sun gear 21*f*, and an inner gear 21*e* with which the lower planetary gears 21*h* are respectively engaged.

The output gear 22 is coupled with a lower surface of the lower planetary carrier plate 21*g* outputting reduced rotation of the second speed reducer 21 to be integrally rotatable with the lower planetary carrier plate 21*g*. The lower planetary carrier plate 21*g* and the output gear 22 are rotatably supported by a center shaft 22*a* oriented in the vertical direction. The center shaft 22*a* is coaxially aligned with the rotating shaft 16*a* of the motor 16 and the connecting shaft 21*a*.

The driving unit 4 is formed into a straight shape elongating vertically. The motor 16, the first speed reducer 19, the braking part 20, and the second speed reducer 21 are connected in series in this order in the vertical direction to be formed into a slender cylindrical shape elongating in the vertical direction, and thus the driving unit 4 is easily built in the storage space 11 with a narrow width.

It is further preferable for the driving unit 4 that a motive power transmission path from the rotating shaft 16*a* of the motor 16 to the output gear 22 is arranged into a straight line in the vertical direction passing through a center of the rotating shaft 16*a*. For example, when the planetary gear mechanism is used as the speed reducer, a rotation center of the rotating shaft 16*a*, each rotation center of the sun gears 19*a*, 21*b*, 21*f* of the planetary gear mechanisms, and a rotation center of the output gear 22 are arranged on a straight line in the vertical direction. Thus, the driving unit 4 can have a formation of which size in a radius direction centered on the rotating shaft 16*a* is further reduced.

The output gear 22 engages with the rack gear 14*b* of the rack 14 of the connection mechanism 6. The engagement between the output gear 22*a* and the rack gear 14*b* is held by the engagement holding unit 23 to be invariably kept in a constant condition. The engagement holding unit 23 movably supports the rack 14 in the longitudinal direction while reducing deviance of a pitch between the output gear 22 and the rack gear 14*b* and deviance of an engagement position in an axis direction of the center shaft 22*a* between the output gear 22 and the rack gear 14*b*.

The engagement holding unit 23 comprises an upper cover 24 rotatably coupled with a lower portion of the lower case part 18*c* and a lower base 25 fixed to a lower side of the upper cover 24.

The upper cover 24 has a holding part 24*a* upwardly open in a circular shape. The holding part 24*a* is fixed to a peripheral surface of a circular supporting part 181*c* formed in a cylindrical shape provided at a lower portion of the lower case part 18*c*, and thus the upper cover 24 is coupled with the lower portion of the lower case part 18*c* to be rotatable in a predetermined angle range around an axis in the vertical direction together with the lower base 25. Preferably, both rotation centers of the upper cover 24 and the lower base 25 are set to be arranged on the same line on which the rotation centers of the rotating shaft 16*a* of the motor 16 and the center shaft 22*a* of the output gear 22 are arranged.

Two rollers 26 are respectively supported between the upper cover 24 and the lower base 25 such that each of them is rotatable around an axis in the vertical direction. Thus, the upper cover 24 and the lower base 25 are fixed to each other with a predetermined interval which is at least larger than a thickness of the rack 14 in the vertical direction.

The rollers 26 contact the rack 14 with a non-gear surface 14*d* which is another edge portion on the opposite side of the edge portion provided with the rack gear 14*b* to restrain looseness of the rack 14 in the transverse direction. Thus, an engagement allowance between the rack gear 14*b* of the rack 14 and the output gear 22 is constantly kept, and the engagement between the rack gear 14*b* and the output gear 22 is made secure.

Figure 12:
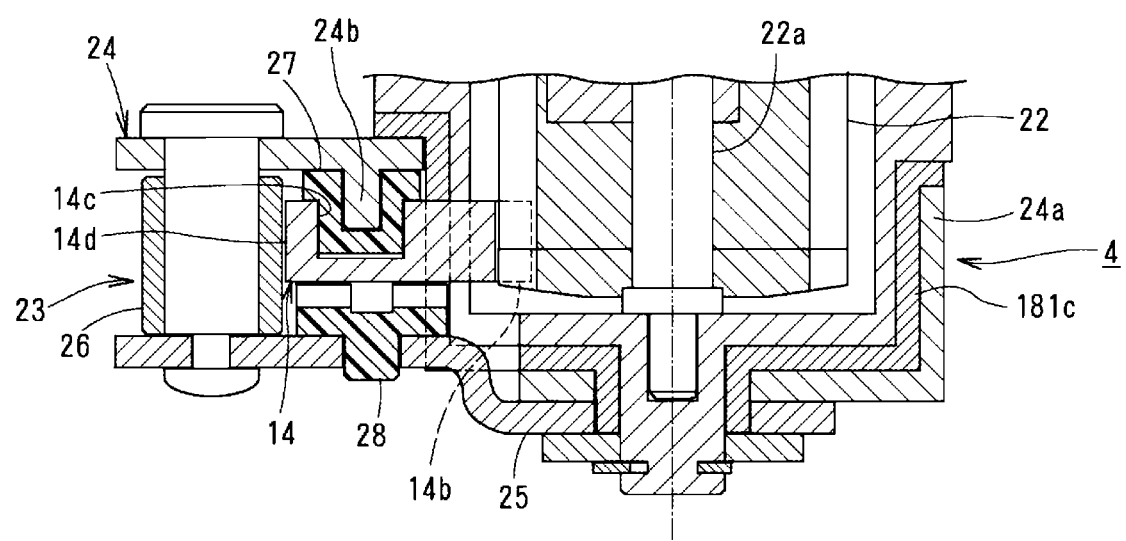
FIG. 12 is an enlarged sectional view taken along the line XII-XII in FIG. 8.

As particularly understandable from FIG. 12, a protruding portion 24*b* projecting to the guide recessed groove 14*c* is provided on a lower surface of the upper cover 24 facing the lower base 25. A guide member 27 made of synthetic resin is fit and fixed to the protruding portion 24*b*. The guide member 27 fits into the guide recessed groove 14*c* of the rack 14 to be relatively slidable in the longitudinal direction of the rack 14.

A shoe 28 made of synthetic resin is fixed to an upper surface of the lower base 25 facing the guide member 27. The shoe 28 comes into contact with a lower surface of the rack 14 to be relatively slidable along the longitudinal direction of the rack 14. Thus, the rack 14 is interposed between the guide member 27 and the shoe 28 such that the upper and lower surfaces of the rack 14 respectively contact with the guide member 27 and the shoe 28. Thus, looseness of the rack 14 in the vertical direction, in other words, in the axial direction of the center shaft 22*a* is restrained, and the engagement between the rack gear 14*b* and a pinion 22 is made secure.

In an embodiment, in the case of the closed state of the side door 3 shown in FIG. 3, when the rack 14 relatively moves in the longitudinal direction by pushing forward (opening direction) following a normal rotation of the output gear 22 driven by the motor 16, the side door 3 swings in an opening direction around the hinge shaft 12*c* of the door hinge 12 and finally opens to a fully open position shown in FIG. 4. Concurrently, the rack 14 swings in a clockwise direction around the connecting shaft 15. When the side door 3 reaches the fully open position, the moving member 12*b* of the door hinge 12 comes into contact with the stopper part of the fixing member 12*a*, and/or the stopper part 14*a* fixed to the rack 14 comes into contact with both of the upper cover 24 and the lower base 25, thereby blocking any more movement of the side door 3 in the opening direction.

Incidentally, in the case that the motor 16 is made to drive, a voltage is applied to the brake assembly 20*a* of the braking part 20 to release the brake. When the side door 3 reaches the fully open position, energization to the motor 16 is stopped and energization to the brake assembly 20*a* is also stopped. Then, the side door 3 is held at the fully open position by the braking force of the braking part 20.

In the case of the fully open state of the side door 3 shown in FIG. 4, when the rack 14 relatively moves in the longitudinal direction (closing direction) by pulling backward following a reverse rotation of the output gear 22 driven by the motor 16, the side door 3 swings in a closing direction around the hinge shaft 12*c* of the door hinge 12 and finally closes to the closed position shown in FIG. 3. Concurrently, the rack 14 swings in a counterclockwise direction around the connecting shaft 15. When the side door 3 reaches the closed position, the door latch device 8 engages with a striker in a side of the vehicle body 5, thereby holding the side door 3 at the closed position. Incidentally, in the case that the motor 16 is made to drive, a voltage is applied to the brake assembly 20a of the braking part 20 to release the brake. Moreover, when the side door 3 reaches the closed position, energization to the motor 16 is stopped and energization to the brake assembly 20a is also stopped.

Figure 11:
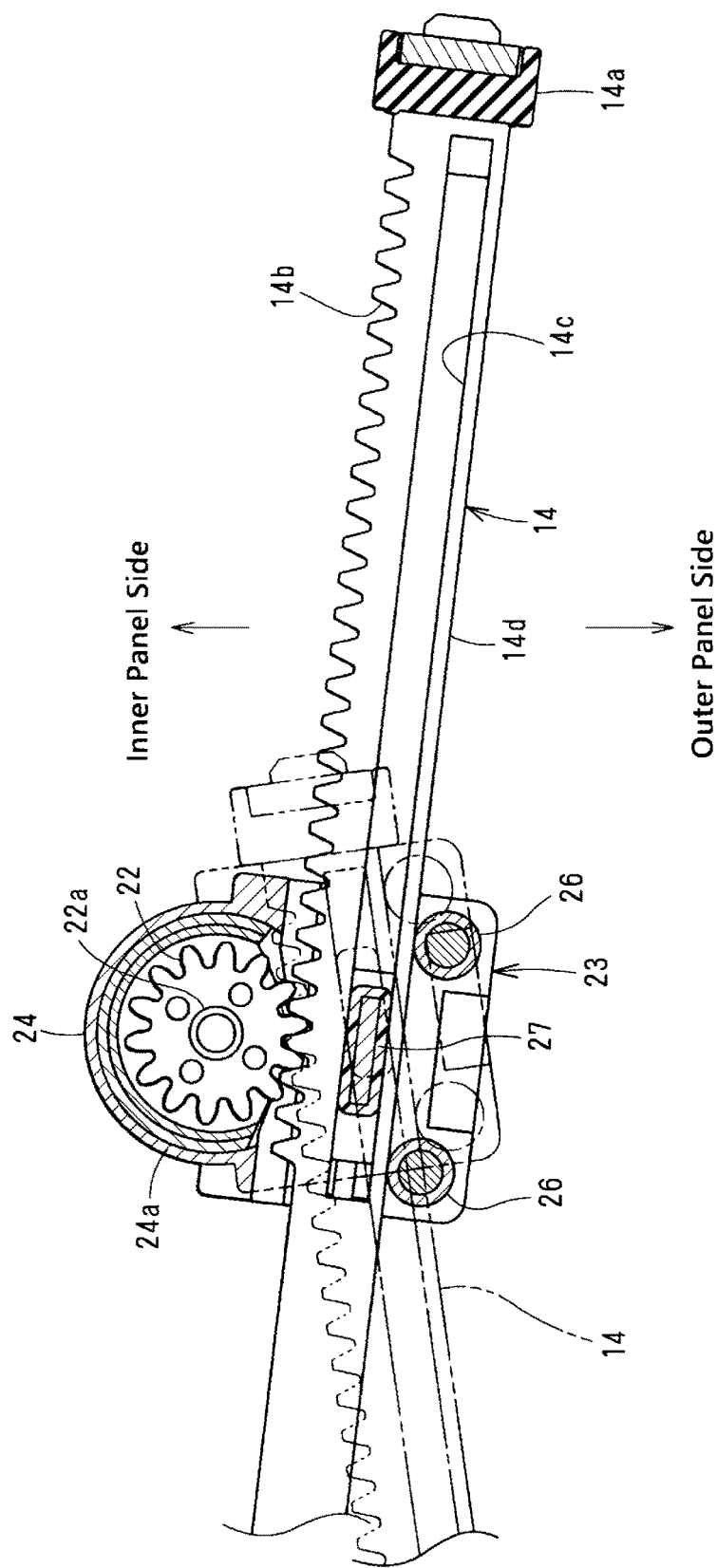
FIG. 11 is a sectional view taken along the line XI-XI in FIG. 8.

When the rack 14 swings around the connecting shaft 15 following the opening/closing operation of the side door 3, an engaging angle of the rack gear 14b of the rack 14 with respect to the output gear 22 changes because a rotation center of the side door 3 (a rotation center of the hinge shaft 12c of the door hinge 12) and a rotation center of the rack 14 (a rotation center of the connecting shaft 15) are eccentric each other in the transverse direction. For details, as understandable from FIG. 11, when the rack 14 is at the closed position shown by a solid line, the rack 14 engages with the output gear 22 by the rack gear 14b with an inclined posture such that the rear end portion (the end portion provided with the stopper part 14a) accesses the outer panel 3a, and when the rack 14 is at the fully open position shown by a two-dot chain line, the rack 14 is in a slightly rotated state in the counterclockwise direction around the rotation center of the output gear 22 (the rotation center of the center shaft 22a) from the posture at the fully closed position and engages with the output gear 22 by the rack gear 14b with an inclined posture such that the rear end portion accesses the inner panel 3b.

In this embodiment, since the engagement holding unit 23 constantly keeping the engagement allowance between the rack 14 and the output gear 22 has the formation to rotate around the rotation center of the output gear 22 at the lower portion of the gear case 18, the engagement holding unit 23 rotates around the rotation center of the output gear 22 following the swing of the rack 14 caused by the opening/closing operation of the side door 3, thereby absorbing the swing of the rack 14. Thus, the engagement allowance between the rack 14 and the output gear 22 is constantly kept, the rack 14 is driven to smoothly move in the longitudinal direction by the motor 16, and therefore the side door 3 can be smoothly and surely operated to open and close.

As described above, in this embodiment, since the connection mechanism 6 is formed with the single rack 14 and the connecting shaft 15 for pivotably supporting the rack 14 in the vehicle body side, the formation thereof is simple compared to that formed with a plurality of rinks and a plurality of center shafts as in the conventional art, the engagement allowance between the rack 14 and the output gear 22 is constantly kept, and therefore the side door 3 can be smoothly operated to open and close over a long period.

When the side door 3 is in the closed state, the door latch device 8 is engaged with the striker (not shown) in the side of the vehicle body 5, and the strong braking is applied to the side door 3 by the braking part 20 that is in the non-energizing stand-by state. In the closed state, when a user operates the outside handle 3A or the inside handle respectively from the exterior or interior of the vehicle to unlatch the door latch device 8, the braking part 20 releases the brake by energizing in conjunction with such an operation. Thus, the user can move the side door 3 from the closed position in the opening direction with a small force without the effect of the resistance by the braking force of the braking part 20.

When the side door 3 is moving in the opening direction from the closed position, the opening movement is sometimes accelerated without control, unexpectedly and suddenly by effects such as an inclination of the vehicle 2 in the longitudinal direction, strong wind and so on because the braking part 20 releases the brake. As a countermeasure for such an uncontrolled motion, when the side door 3 reaches a predetermined half-open position, the braking part 20 produces the weak braking by an energization control to restrain the side door 3 from moving in the opening direction suddenly across the predetermined half-open position.

An opening angle at the predetermined half-open position of the side door 3 is preferably about 10 degrees. The opening angle is detected by an angular velocity sensor 3B.

When the side door 3 reaches the predetermined half-open position, the braking part 20 produces the weak braking for about 1 to 2 seconds. The braking force for the side door 3 by the weak braking is set mildly. The braking force is preferably in the degree that a user does not feel uncomfortable when moving the side door 3 in the opening direction by the user's sequential opening operation.

The production of the weak braking at the predetermined half-open position of the side door 3 is possible to be limited only when a user operates the side door 3 from the interior. When a user opens the side door 3 with the outside handle 3A from the vehicle exterior, it is unnecessary to apply the weak braking to the side door 3 because the user is outside of the side door 3. When the side door 3 passes through the predetermined half-open position by the closing operation of the side door 3, it is also unnecessary to apply the weak braking to the side door 3.

When the side door 3 is moved in the opening direction across the predetermined half-open position and is kept at a predetermined position or a constant angle for a predetermined time, the strong braking is applied to the side door 3 by making the braking part 20 in the non-energizing state. Preferably, when the side door 3 is opened at an angle of about 25 degrees or the side door 3 is kept unmoving for more than 2 seconds, a predetermined door opening resistance is applied to the side door 3 by the strong braking. This resistance gives the side door 3 the same effect as that of a moderation resistance which is given to the side door 3 by a general check link.

When the side door 3 is in the open state, the braking part 20 is in the non-energizing stand-by state and applies the strong braking to the side door 3. In the open state, when a user holds the outside handle 3A, the electrostatic capacitive sensor provided to the outside handle 3A or in the vicinity thereof detects the user's hand and the braking part 20 releases the brake by energizing. Thus, the user can move the side door 3 from the open position in the closing direction with a small force without the effect of the resistance of the braking force of the braking part 20. According to such a formation, when the side door 3 is in the open state, the side door 3 does not close unexpectedly by effects such as wind and so on unless a user holds the outside handle 3A.

What is claimed is:

1. A vehicle side door opening/closing device for operating to open and close a side door pivotably supported to a vehicle body by a door hinge, comprising:
   a motor provided in the side door,
   a gear case fixed to the side door directly or indirectly, the motor being fixed to the gear case,
   a speed reducer built in the gear case and reducing rotation of a rotating shaft of the motor,
   an output gear provided to an output part of the speed reducer,
   a rack that has an end portion pivotably supported to the vehicle body and another end portion inserted into the side door and is provided with a rack gear along an edge portion of the rack to engage with the output gear, and an engagement holding unit connected with the gear case and movably supporting the rack in a longitudinal direction while constantly keeping an engagement allowance between the rack and the output gear, wherein the side door is moved in an opening direction by pushing the rack in the longitudinal direction following the rotation of the output gear and the side door is moved in a closing direction by pulling the rack in the longitudinal direction following the rotation of the output gear, wherein the engagement holding unit is connected with the gear case to be rotatable around a rotation center of the output gear and rotates around the rotation center of the output gear by a swing of the rack following the opening/closing operation of the side door, and wherein the engagement holding unit comprises:

a cover rotatably connected with an end portion of the gear case;

a base fixed opposite to the cover; and a roller interposed between the cover and the base, rotatably supported around an axis oriented in the same direction as an axial direction of the rotation of the output gear, and contactable with the rack on another edge portion on the opposite side of the edge portion provided with the rack gear.

2. The vehicle side door opening/closing device according to claim 1, wherein the rack comprises a guide recessed groove extending in the longitudinal direction, and the engagement holding unit comprises a guide member that protrudes to the guide recessed groove from the cover and slidably fits into the guide recessed groove in the longitudinal direction.

3. The vehicle side door opening/closing device according to claim 2, wherein the rack comprises a stopper part coming into contact with the cover and the base of the engagement holding unit at a position corresponding to a fully open position of the side door.

4. The vehicle side door opening/closing device according to claim 1, wherein the rack comprises a stopper part coming into contact with the cover and the base of the engagement holding unit at a position corresponding to a fully open position of the side door.

5. The vehicle side door opening/closing device according to claim 1, wherein the engagement holding unit has a holding part upwardly open in a circular shape, the gear case has a circular supporting part formed in a cylindrical shape provided at its lower portion, the holding part is rotatably fixed to a peripheral surface of the circular supporting part, and thereby connecting the engagement holding unit with the gear case to be rotatable.

* * * * *